(12) United States Patent
Zanek

(10) Patent No.: US 9,169,759 B2
(45) Date of Patent: Oct. 27, 2015

(54) FUEL RESERVOIR

(75) Inventor: Steffen Zanek, Schwäbisch Gmünd (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 437 days.

(21) Appl. No.: 13/607,868

(22) Filed: Sep. 10, 2012

(65) Prior Publication Data

US 2013/0240055 A1    Sep. 19, 2013

(30) Foreign Application Priority Data

Sep. 10, 2011    (DE) .......................... 10 2011 113 192

(51) Int. Cl.
*F01N 3/20* (2006.01)
*F16L 53/00* (2006.01)
*B60K 15/03* (2006.01)

(52) U.S. Cl.
CPC ............. *F01N 3/2066* (2013.01); *F16L 53/001* (2013.01); *B60K 2015/0344* (2013.01); *B60K 2015/0348* (2013.01); *B60K 2015/03105* (2013.01); *B60K 2015/03348* (2013.01); *B60K 2015/03427* (2013.01); *F01N 2610/02* (2013.01); *F01N 2610/10* (2013.01); *F01N 2610/1406* (2013.01); *Y02T 10/24* (2013.01); *Y02T 10/26* (2013.01); *Y10T 137/6416* (2015.04); *Y10T 137/6579* (2015.04); *Y10T 137/85954* (2015.04); *Y10T 137/86035* (2015.04)

(58) Field of Classification Search
CPC ..... Y02T 10/26; Y02T 10/24; F01N 2610/02; F01N 3/2066; F01N 2610/10; Y10T 137/6579; Y10T 137/85954; Y10T 137/86035
USPC ................. 137/339, 340, 573, 574, 576, 563; 123/1 A, 514; 60/286, 274, 295, 301
See application file for complete search history.

(56) References Cited

U.S. PATENT DOCUMENTS

| 6,223,526 | B1 * | 5/2001 | Wissler et al. | .................. 60/286 |
| 8,857,160 | B2 * | 10/2014 | Haeberer | ........................ 60/295 |
| 2008/0035649 | A1 * | 2/2008 | Ohlsson et al. | ............... 220/564 |
| 2012/0006815 | A1 * | 1/2012 | Sendlhofer et al. | .......... 220/4.14 |

FOREIGN PATENT DOCUMENTS

| DE | 197 29 003 C2 | 2/1999 | |
| DE | 19729003 C2 | 2/1999 | |
| DE | 102009000094 A1 | 7/2010 | |
| DE | 102009009676 A1 * | 8/2010 | ............. B60K 15/03 |
| DE | 102009009676 A1 | 8/2010 | |
| DE | 10 2009 000 094 A1 | 11/2011 | |
| EP | 1645452 A1 | 4/2006 | |

(Continued)

*Primary Examiner* — Atif Chaudry
(74) *Attorney, Agent, or Firm* — Jordan IP Law, LLC; Todd A. Vaughn

(57) ABSTRACT

A fuel reservoir with a diesel tank for receiving diesel fuel and a reduction agent tank for receiving urea. A partition wall is provided between the diesel tank and the reduction agent tank, and a diesel return line extends into the diesel tank. The diesel tank is fitted with a wash plate which has at least one passage opening and lies opposite the partition wall forming a diesel preheating chamber. The at least one passage opening is arranged in the wash plate such that diesel from the diesel return line is captured and held in the diesel preheating chamber.

18 Claims, 1 Drawing Sheet

(56) References Cited

FOREIGN PATENT DOCUMENTS

| | | |
|---|---|---|
| EP | 1 995 104 A2 | 11/2008 |
| EP | 1995104 A2 | 11/2008 |
| JP | 2005 291 086 A | 10/2005 |
| JP | 2005291086 A | 10/2005 |
| WO | 2005/066 471 A1 | 7/2005 |
| WO | 2005066471 A1 | 7/2005 |
| WO | WO 2010108199 A2 * | 9/2010 .......... B60K 15/077 |

* cited by examiner

FUEL RESERVOIR

CROSS-REFERENCE TO RELATED APPLICATIONS

The present application claims priority under 35 U.S.C. §119 to German Patent Application No. 10 2011 113 192.6 (filed on Sep. 10, 2011), which is hereby incorporated by reference in its entirety.

FIELD OF THE INVENTION

The invention relates to a fuel reservoir having a reduction agent tank, a diesel tank with a wash plate which has at least one passage opening, a partition wall spatially positioned between the diesel tank and the reduction agent tank, and a diesel return line in fluidic communication with the diesel tank.

BACKGROUND OF THE INVENTION

A fuel reservoir is described in German Patent Publication DE 10 2007 012 948 A1, in which a fuel reservoir has a diesel tank and a reduction agent tank in which generally urea is stored. The urea is added metered to the exhaust gases as a reduction agent.

To reduce hunting movements of the fuel, in this case diesel, in the diesel tank and reduce the flow in the tank, a wash plate with passage openings is provided in the interior of the diesel tank.

On use of a reduction agent, in particular urea, there is a risk of freezing at low temperatures. This is the case in particular if the walls of the reduction agent chamber are in direct contact with the environment or the vehicle exterior. To prevent this risk, therefore, additional heating for the reduction agent tank has already been proposed.

German Patent Publication DE 197 29 003 C2 describes a tank for a vehicle with an exhaust cleaning system operated with a reduction agent. Here the diesel tank and the reduction agent tank are joined into one unit. For heat transmission, the partition walls between the reduction agent tank and the diesel tank are formed with good thermal conductivity.

SUMMARY OF THE INVENTION

Embodiments of the invention include a fuel reservoir having a simple and highly effective design which facilitates heating and/or preheating of the reduction agent tank.

In accordance with embodiments of the invention, a fuel reservoir includes a reduction agent tank, a diesel tank with a wash plate which has at least one passage opening, a partition wall spatially positioned between the diesel tank and the reduction agent tank, and a diesel return line in fluidic communication with the diesel tank.

The wash plate lies spatially opposite to the partition wall forming a diesel preheating chamber. The at least one passage opening is arranged in the wash plate such that diesel fuel from the diesel return line is captured in the diesel preheating chamber and held there for a longer period.

Diesel fuel can be extracted in a known manner from the diesel tank to supply the engine. Some of the diesel fuel is returned from the engine to the diesel tank via the diesel return line. This returned diesel fuel is heated.

In accordance with embodiments, a fuel reservoir for a vehicle is provided, the fuel reservoir including at least one of the following: a diesel tank having a wash plate with a plurality of passage openings; a reduction agent tank; a partition wall between the diesel tank and the reduction agent tank, the partition wall and wash plate defining a diesel preheating chamber; a diesel return line in fluidic communication with the diesel tank and which permits a return of diesel fuel from an engine of the vehicle to the diesel tank; and a balancing valve in a lower region of the wash plate and configured to balance diesel fuel between the diesel tank and the diesel preheating chamber, the passage openings being configured to permit a flow of diesel fuel from the diesel return line to be captured and held in the diesel preheating chamber.

In accordance with embodiments, a fuel reservoir for a vehicle having an engine is provided, the fuel reservoir including at least one of the following: a first tank configured to receive a first fluid comprising fuel; a second tank configured to receive a second fluid; a first wall provided in the first tank and having at least one passage opening; a second wall between the first tank and the second tank, the first wall and the second wall defining a chamber which permits preheating of the fuel therein; and a fuel return line in fluidic communication with the first tank, the fuel return line permitting a return of fuel from an engine of the vehicle to the first tank, the at least one passage opening permitting a flow of fuel from the fuel return line to be captured and held in the chamber.

In accordance with embodiments, a fuel reservoir for a vehicle having an engine is provided, the fuel reservoir including at least one of the following: a first tank configured to receive a first fluid; a second tank configured to receive a second fluid; a first wall provided in the first tank and having at least one passage opening; a second wall between opposite the first wall to define a chamber which permits preheating of the first fluid therein; and a fluid return line in fluidic communication with the first tank, the fuel return line permitting a return of the first fluid from the engine to the first tank, the at least one passage opening permitting a flow of the first fluid from the fluid return line to be captured and held in the chamber the first fluid heating the second wall, the second wall serving as a conductor which heats the second fluid.

In accordance with embodiments of the invention, due to the arrangement of the wash plate and the entry of the diesel return line into the diesel preheating chamber, heat from the diesel fuel returned in a usual manner can, via the partition wall which in this case serves as a heat conductor, be used to preheat the reduction agent present in the reduction agent tank.

In accordance with embodiments of the invention, many different designs are possible for using the tank chamber formed in this way between the wash plate and the partition wall as a diesel preheating chamber. The essential factor here is merely that the diesel returned to the diesel preheating chamber is held in this chamber as long as possible for heat emission.

In a particularly advantageous embodiment, the at least one passage opening is arranged in the upper region of the wash plate. This embodiment achieves that the diesel remains in the diesel preheating chamber as long as possible. Only when this chamber is almost full do one or more passage openings take effect to balance the diesel.

It is advantageous if the partition wall has a good thermal conductivity. To achieve maximum effectiveness in terms of heat transfer, the partition wall can have a substantially greater thermal conductivity than the wash plate. This is possible, e.g., by forming the partition wall from a metal such as steel or an aluminium alloy. Embodiments, however, are not limited to these materials, and may encompass other materials which exhibit good heat transfer.

In a further advantageous embodiment of the invention, the wash plate in the lower region is fitted with a balancing valve via which diesel fuel can flow into the diesel preheating chamber where necessary. The diesel fuel for supply to the combustion engine is preferably taken from the diesel preheating chamber.

A highly advantageous solution to the task, which is also possible irrespective of a design of the fuel reservoir with a wash plate lying opposite the partition wall, is that before entering the diesel tank, the diesel return line is guided through the reduction agent tank in the form of a heating loop. The direct entry of the diesel return line into the reduction agent tank and its passage in the form of a heating loop or coil achieves a direct preheating of the reduction agent.

Advantageous refinements and embodiments arise from the remaining subclaims and the embodiment examples described below in principle with reference to the drawing.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

The design of a fuel reservoir with a diesel tank, a reduction agent tank, a wash plate in the diesel tank, and a partition wall between the diesel tank and the reduction agent tank is generally known so will not be described in greater detail hereinbelow. In general, urea, also known as "AdBlue," is present in the reduction agent tank.

Figure 1:
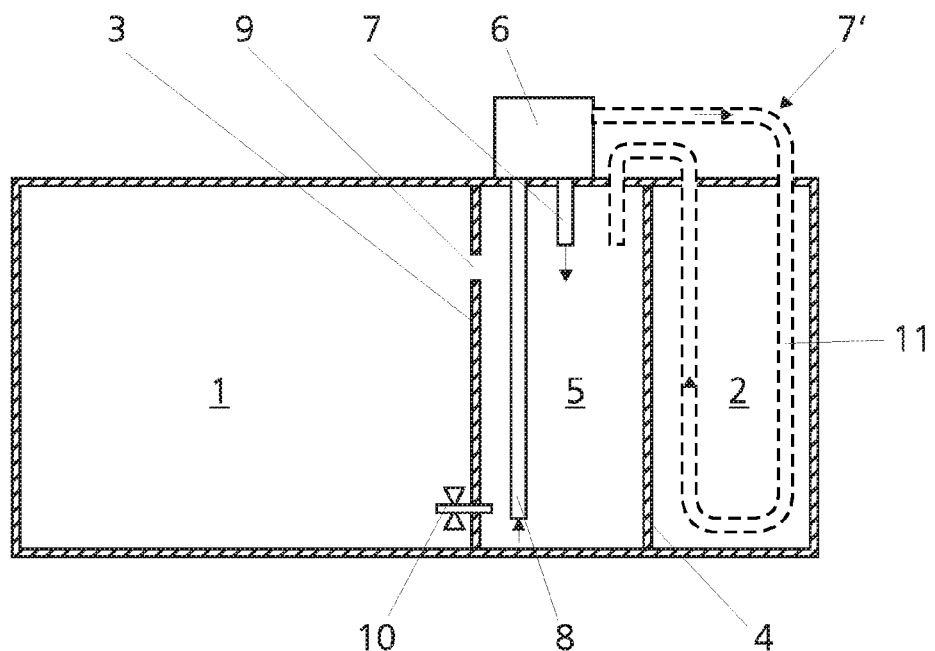
FIG. 1 illustrates a side view of a fuel reservoir in accordance with embodiments of the invention.

As illustrated in FIG. 1, a fuel reservoir includes a reduction agent tank 2, a diesel tank 1 with a wash plate 3 having at least one passage opening 9, a partition wall 4 spatially positioned between the diesel tank 1 and the reduction agent tank 4, and a diesel return line 7 in fluidic communication with the diesel tank 1. The wash plate 3 lies spaced from and opposite the partition wall 4, and in this way defines a separate region in the diesel tank 1 which serves as a diesel preheating chamber 5.

A diesel emitter 6 in fluidic communication with a diesel supply line 8 and the diesel return line 7 which opens into the diesel preheating chamber 5 of the diesel tank 1. In the lower region of the diesel preheating chamber 5, via the diesel supply line 8, diesel fuel is extracted and supplied to a combustion engine (not shown).

Figure 2:
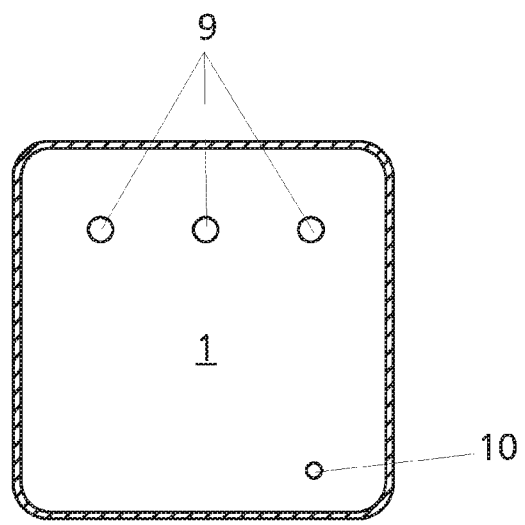
FIG. 2 illustrates a top view of a wash plate of the fuel reservoir in accordance with embodiments of the invention.

As illustrated in FIG. 2, the wash plate 3 has a plurality of passage openings 9 in its upper region. While three passage openings 9 are illustrated, embodiments are not limited to such a number, and may encompass as many passage openings depending on certain factors related to the respective application, such as, for example, the volumetric capacity of the diesel preheating chamber 5. The volumetric capacity of the diesel preheating chamber 5 can be between 10% and 20% of the overall volume of the diesel tank 1. The overall width of the diesel preheating chamber 5 between the partition wall 4 and the wash plate 3 can be in a range between 150 mm and 450 mm, and preferably between 200 mm and 300 mm.

To balance the diesel stock between the diesel tank 1 and the diesel preheating chamber 5, a balancing valve 10 is provided in the lower region.

As illustrated in FIG. 1, in addition or alternatively to the embodiment described hereinabove of a diesel preheating chamber 5, before its entry or inlet into the diesel tank 1 the diesel return line 7' (in dashed lines) can be guided through the reduction agent tank 2 in the form of a heating loop 11.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. Fuel reservoir for a vehicle, the fuel reservoir comprising:
    a diesel tank configured to receive diesel fuel, the diesel tank having a wash plate with a plurality of passage openings;
    a reduction agent tank configured to receive a reduction agent;
    a partition wall between the diesel tank and the reduction agent tank, the partition wall and wash plate defining a diesel preheating chamber, wherein the partition wall is composed of a material having a higher thermal conductivity than the wash plate;
    a diesel return line in fluidic communication with the diesel tank and which permits a return of diesel fuel from an engine of the vehicle to the diesel tank; and
    a balancing valve in a lower region of the wash plate and configured to balance diesel fuel between the diesel tank and the diesel preheating chamber,
    wherein the passage openings are configured to permit a flow of diesel fuel from the diesel return line to be captured and held in the diesel preheating chamber.

2. The fuel reservoir of claim 1, wherein the passage openings are at an upper region of the wash plate.

3. The fuel reservoir of claim 1, wherein the partition wall is composed of a metal material.

4. The fuel reservoir of claim 3, wherein the metal material comprises steel or aluminium alloy.

5. The fuel reservoir of claim 1, wherein the diesel preheating chamber has a volumetric capacity that is in a range of between 10% and 20% of an overall volumetric capacity of the diesel tank.

6. The fuel reservoir of claim 1, wherein the width of the diesel preheating chamber is in a range of between 150 mm and 450 mm.

7. The fuel reservoir of claim 1, wherein the width of the diesel preheating chamber is in a range of between 200 mm and 300 mm.

8. The fuel reservoir of claim 1, wherein the plurality of passage openings comprises three passage openings.

9. Fuel reservoir for a vehicle having an engine, the fuel reservoir comprising:
    a first tank configured to receive a first fluid comprising fuel;
    a second tank configured to receive a second fluid;
    a first wall provided in the first tank and having at least one passage opening;
    a second wall between the first tank and the second tank, the first wall and the second wall defining a chamber which permits preheating of the fuel therein, wherein the second wall is composed of a material having a higher thermal conductivity than the first wall; and a fuel return line in fluidic communication with the first tank, the fuel return line permitting a return of fuel from the engine to the first tank, wherein the at least one passage opening permits a flow of fuel from the fuel return line to be captured and held in the chamber.

10. The fuel reservoir of claim 9, further comprising a balancing valve in the first wall configured to balance diesel fuel between the diesel tank and the diesel preheating chamber.

11. The fuel reservoir of claim 9, wherein before entering the first tank, the fuel return line extends through the second tank in the form of a heating loop.

12. The fuel reservoir of claim 9, wherein the at least one passage opening is arranged in an upper region of the first wall.

13. The fuel reservoir of claim 9, wherein the second wall is composed of a metal material.

14. The fuel reservoir of claim 13, wherein the metal material comprises steel or aluminium alloy.

15. The fuel reservoir of claim 9, wherein the chamber has a volumetric capacity that is in a range of between 10% and 20% of an overall volumetric capacity of the first tank.

16. The fuel reservoir of claim 9, wherein the width of the chamber is in a range of between 150 mm and 450 mm.

17. The fuel reservoir of claim 9, wherein the width of the chamber is in a range of between 200 mm and 300 mm.

18. A reservoir for a vehicle having an engine, the reservoir comprising:
- a first tank configured to receive a first fluid;
- a second tank configured to receive a second fluid;
- a first wall provided in the first tank and having at least one passage opening;
- a second wall opposite the first wall to define a chamber which permits preheating of the first fluid therein, wherein the second wall is composed of a material having a higher thermal conductivity than the first wall; and
- a fluid return line in fluidic communication with the first tank, the fuel return line permitting a return of the first fluid from the engine to the first tank, wherein the at least one passage opening permits a flow of the first fluid from the fluid return line to be captured and held in the chamber the first fluid heating the second wall, the second wall serving as a conductor which heats the second fluid.

* * * * *